(12) United States Patent
Chang et al.

(10) Patent No.: US 7,265,588 B2
(45) Date of Patent: Sep. 4, 2007

(54) DYNAMIC CLOCK CHANGE CIRCUIT

(75) Inventors: Christopher Chang, Medfield, MA (US); Jeffrey Lewis Parker, Arlington, MA (US)

(73) Assignee: Digi International, Inc., Minnetonka, MN (US)

(*) Notice: Subject to any disclaimer, the term of this patent is extended or adjusted under 35 U.S.C. 154(b) by 132 days.

(21) Appl. No.: 11/205,668

(22) Filed: Aug. 17, 2005

(65) Prior Publication Data

US 2007/0043966 A1 Feb. 22, 2007

(51) Int. Cl.
*H03K 19/00* (2006.01)
(52) U.S. Cl. .......................................... 326/93; 326/38
(58) Field of Classification Search ............ 326/93–98, 326/37, 38, 46
See application file for complete search history.

(56) References Cited

U.S. PATENT DOCUMENTS

| | | | |
|---|---|---|---|
| 4,447,870 A | 5/1984 | Tague et al. ................. 364/200 |
| 4,644,498 A | 2/1987 | Bedard et al. ............... 364/900 |
| 4,685,614 A | 8/1987 | Levine ......................... 236/78 |
| 4,965,524 A | 10/1990 | Patchen | |
| 5,111,160 A * | 5/1992 | Hershberger ................. 331/1 A |
| 5,381,085 A * | 1/1995 | Fischer ..................... 324/76.48 |
| 5,392,435 A | 2/1995 | Masui et al. ................. 395/725 |
| 5,560,017 A | 9/1996 | Barrett et al. ............... 395/733 |
| 5,982,210 A | 11/1999 | Rogers ......................... 327/156 |
| 6,175,929 B1 | 1/2001 | Hsu et al. .................... 713/500 |
| 6,421,754 B1 * | 7/2002 | Kau et al. .................... 710/261 |
| 6,483,888 B1 | 11/2002 | Boerstler et al. | |
| 6,771,590 B1 | 8/2004 | Marchok et al. ............ 370/207 |
| 6,911,872 B2 | 6/2005 | Shah et al. .................... 331/57 |
| 2003/0179024 A1* | 9/2003 | Montagnana ............... 327/156 |

FOREIGN PATENT DOCUMENTS

| | | |
|---|---|---|
| EP | 0 242 010 A1 | 1/1987 |
| GB | 2 228 598 A | 8/1990 |

OTHER PUBLICATIONS

Shi, Kaijian et al, Hierarchical Timing Closure Methodology for OMAP: An Open Multimedia Application Platform, ASIC, 2003. vol. 1, pp. 238-241, (no month).

* cited by examiner

*Primary Examiner*—Don Le
(74) *Attorney, Agent, or Firm*—Greenberg Traurig, LLP; Kenneth F. Kozik

(57) ABSTRACT

A clock change circuit includes enabling a clock change frequency to be accepted while a system is active and clock frequencies are at a low period. The circuit includes generating an enabling signal representing a window of time in which a frequency change is accomplished.

5 Claims, 3 Drawing Sheets

DYNAMIC CLOCK CHANGE CIRCUIT

BACKGROUND

The present invention relates to a dynamic clock change circuit.

The clock speed of a processor is a factor that determines the computing power of a computer, measured in megahertz (MHz) or gigahertz (GHz). More specifically, clock speed refers to the number of pulses per second generated by an oscillator that sets the speed for the processor. Typically, a manufacturer decides on what speed to stamp on the processor based on factors, such as, core, design, and capabilities of the processor itself, the thermal stability and characteristics of the processor and the most advantageous market conditions.

The actual clock speed of a processor is set by the motherboard. In the past there have been two ways to set the clock speed of the processor. First, using hardware jumpers, one can change the jumpers to get different combinations of basic BUS speeds and multipliers.

Second, using software "jumpers" or "jumper free" motherboards, one can change the clock speed (and the core voltage) of a processor using software embedded in the motherboard BIOS.

In either method, a system needs to be reset to enable a clock frequency change.

SUMMARY

The present invention provides methods and apparatus, including computer program products, for a dynamic clock change circuit.

In one aspect, the invention features a circuit including a counter for receipt of a master clock signal, a multiplexer for receipt of an output of the counter, the multiplexer outputting a clock frequency to a system clock, a flip flop for generating an enable signal corresponding to a low frequency period of the master clock signal and for enabling a clock change request signal, and a NOR gate disposed between the counter and the flip flop.

In embodiments, the counter can be a synchronous counter. The synchronous counter can be a 5-bit counter. The circuit can include a NOR gate disposed between the counter and the flip flop. The output of the counter can be a frequency signal divided by an integer value. The integer value can be selected from a group consisting of 2, 4, 8, 16 and 32.

In another aspect, the invention features a clock frequency change circuit including a synchronous counter for receipt of a master clock signal, a first multiplexer for receipt of an output of the counter, the first multiplexer outputting a clock frequency to a first system clock, a second multiplexer for receipt of the output of the counter, the second multiplexer outputting a clock frequency to a second system clock, and a flip flop for generating an enable signal corresponding to a low frequency period of the master clock signal and for enabling a clock change request signal.

In embodiments, the synchronous counter can be a 5-bit counter. The circuit can include a NOR gate disposed between the counter and the flip flop. The output of the counter can be a frequency signal divided by an integer value. The integer value can be selected from a group consisting of 2, 4, 8, 16 and 32.

In another aspect, the invention features a method of changing a clock frequency of a system clock including receiving a clock frequency change request signal, generating an enabling signal in a flip flop corresponding to a low period of clock signals entering a multiplexer, receiving a master clock signal in the flip flop, and sending the clock frequency change signal to the multiplexer at the time indicated by the enabling signal.

In embodiments, the counter can be a synchronous counter. The synchronous counter can be a 5-bit counter. The method can include outputting a signal from the multiplexer to a system clock.

The invention can be implemented to realize one or more of the following advantages. The circuit enables clock frequency changes without requiring a system reset.

The circuit enables clock speed changes to correspond to different periods of time, such as one speed during the day and another speed during the evening; this saves power.

The circuit enables system clock frequency changes on processors to meet varying performance requirements.

The circuit enables "glitch-free" clock frequency changes by delaying frequency changes to a period before all system clocks transition from 0 to 1.

The circuit can be used with counters of various sizes depending on a desired clock frequency range.

One implementation of the invention provides all of the above advantages.

Details of one or more implementations are set forth in the description below. Other features, aspects, and advantages may be apparent from the description.

BRIEF DESCRIPTION OF THE DRAWINGS

Like reference numbers and designations in the various drawings indicate like

DETAILED DESCRIPTION

Figure 1:
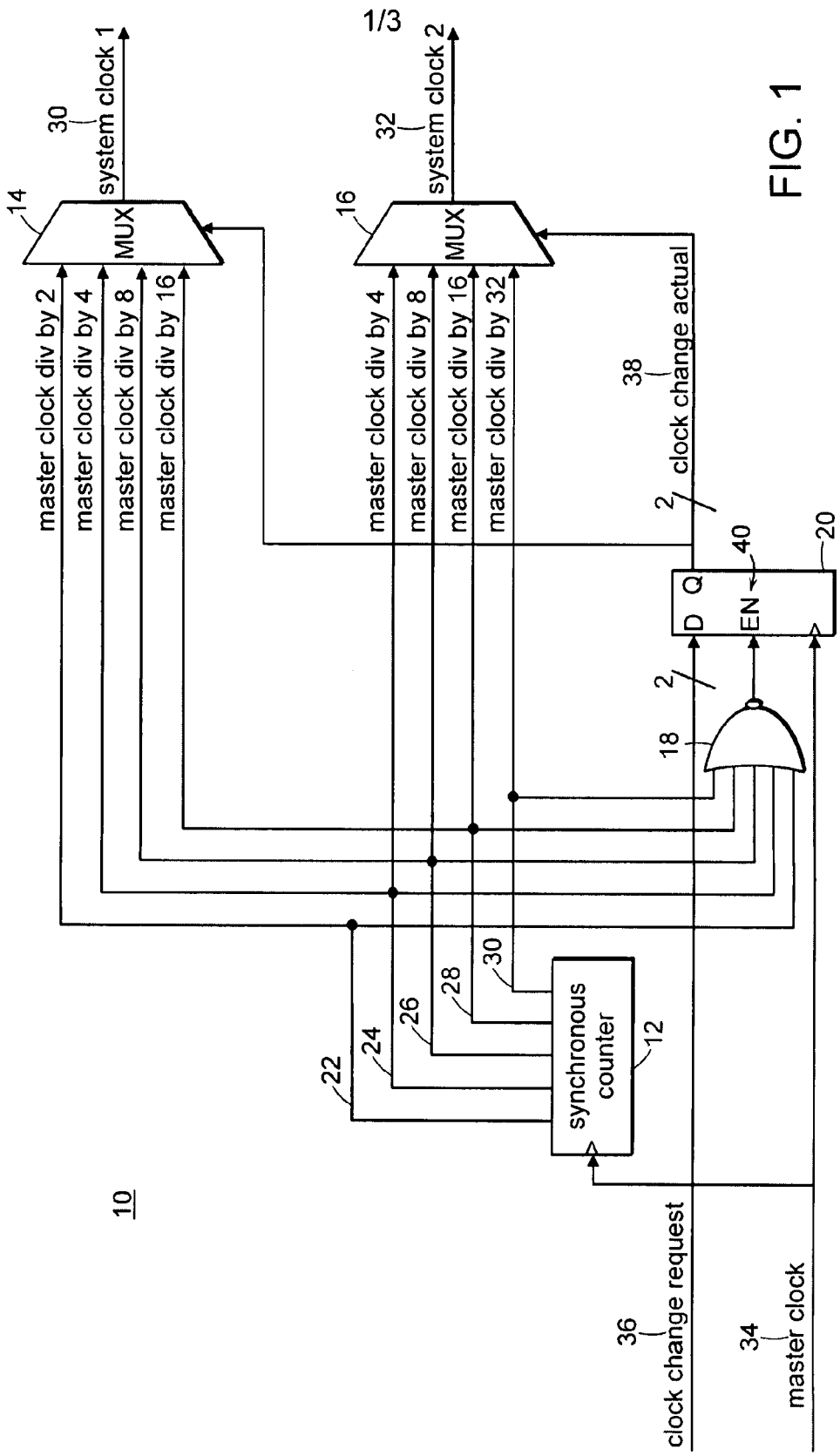
FIG. 1 is a block diagram of an exemplary clock change circuit.

As shown in FIG. 1, an exemplary clock change circuit 10 includes a counter 12, two multiplexers 14, 16, a NOR gate 18 and a flip flop 20. In the circuit 10, the counter 12 is a 5-bit synchronous counter. Other size counters can be used in alternate implementations to achieve a desire clock frequency range. Each of the output signals 22, 24, 26, 28, 30 from the counter 12 are divided by two before entering one of the multiplexers 14, 16. In this example, output signals 22, 24, 26, 28 are divided by two before entering MUX 14, while output signals 24, 26, 28, 30 are divided by two before entering MUX 16. An output of MUX 14 goes to a system clock 30 and an output of MUX 16 goes to a system clock 32.

Circuit 10 includes a master clock signal 34 and a clock change request signal 36. The clock change request signal 36 can be set through software.

Selection of the clock desired frequency 22, 24, 26, 28, 30, divided by two, from the desired MUX 14, 16, is controlled by an output of a "clock change actual" signal 38 from the flip flop 20. Timing of making the selection is accomplished when all five clock frequencies 22, 24, 26, 28, 30 are at a low period, at which point the circuit 10 generates an enable (EN) signal 40. The EN signal 40 opens a small window of time to allow the master clock signal 34 to update the states of clock change actual signal 38. The clock change actual signal 38 selects which clock, i.e., the four clock signals 22,24,26,28 or the four signals 24, 26, 28, 30, going into each of the two MUXs 14, 16, to clock through the selected MUX 14, 16.

Figure 2:
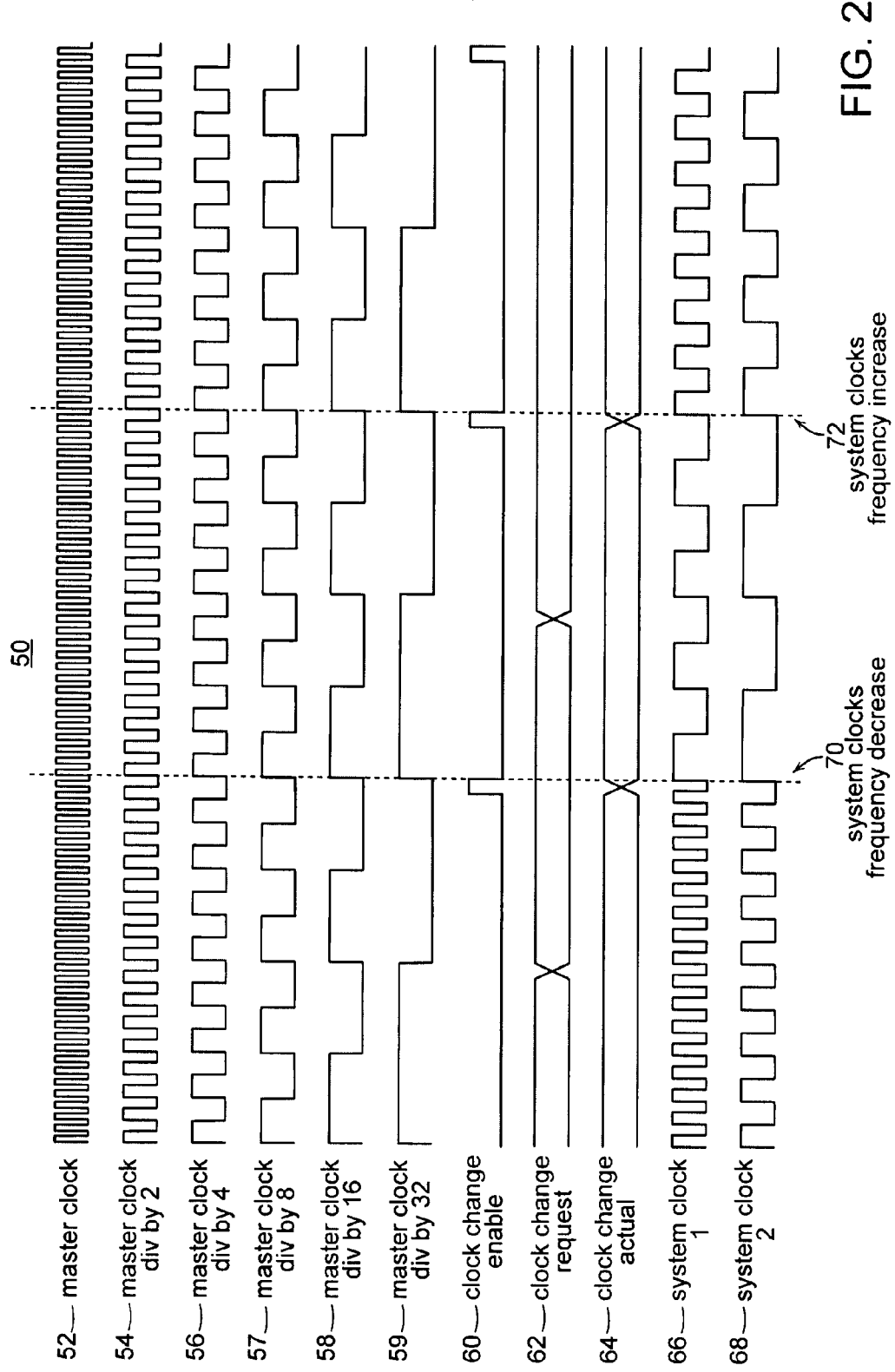
FIG. 2 is an exemplary frequency diagram.

As shown in FIG. 2, an exemplary timing diagram 50 corresponding to the circuit 10 includes a timing of the master clock 52, the master clock divided by two 54, the master clock divided by four 56, the master clock divided by eight 57, the master clock divided by sixteen 58, and the master clock divided by thirty-two 59. The timing diagram 50 includes timing of the clock change enable signal 60, the clock change request signal 62, the clock change actual signal 64, the system clock 66 and system clock 68. The window between when the system clocks 66, 68 frequencies decrease (70) and when the system clocks 66, 68 frequencies increase (72) provides circuit 10's opportunity to change the system clock's frequency.

Figure 3:
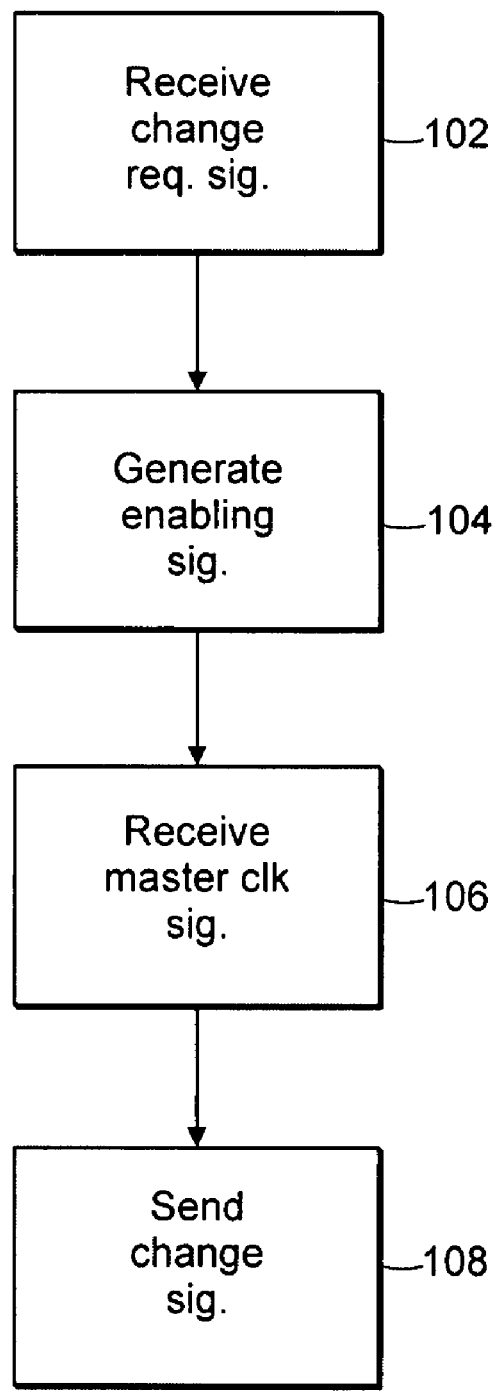
FIG. 3 is a flow diagram.

As shown in FIG. 3, a process 100 includes receiving (102) a clock frequency change request signal. Process 100 generates (104) an enabling signal in a flip flop corresponding to a low period of clock signals entering a multiplexer. Process 100 receives (106) a master clock signal in the flip flop. Process 100 sends (108) the clock frequency change signal to the multiplexer at the time indicated by the enabling signal.

Although only a few embodiments have been described in detail above, other modifications are possible. Actions do not require the particular order described, or sequential order, to achieve desirable results. In certain implementations, multitasking and parallel processing may be advantageous.

What is claimed is:

1. A clock frequency change circuit comprising:
    a synchronous counter for receipt of a master clock signal;
    a first multiplexer for receipt of an output of the counter, the first multiplexer outputting a clock frequency to a first system clock;
    a second multiplexer for receipt of the output of the counter, the second multiplexer outputting a clock frequency to a second system clock; and
    a flip flop for generating an enable signal corresponding to a low frequency period of the master clock signal and for enabling a clock change request signal.

2. The circuit of claim 1 wherein the synchronous counter is a 5-bit counter.

3. The circuit of claim 1 further comprising a NOR gate disposed between the counter and the flip flop.

4. The circuit of claim 1 wherein the output of the counter is a frequency signal is divided by an integer value.

5. The circuit of claim 4 wherein the integer value is selected from a group consisting of 2, 4, 8, 16 and 32.

\* \* \* \* \*